Dec. 12, 1939.   C. J. WERNER   2,182,976
MOTOR CONTROL SYSTEM
Original Filed Oct. 14, 1935
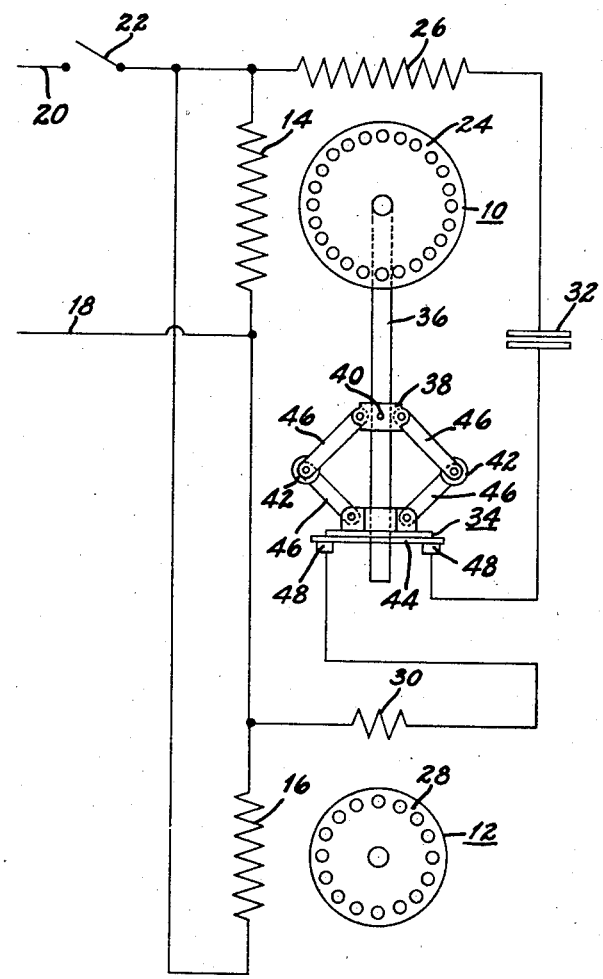
INVENTOR
Calvin J. Werner
BY
Spencer Hardman & Fehr
his ATTORNEYS Patented Dec. 12, 1939

2,182,976

UNITED STATES PATENT OFFICE 2,182,976

MOTOR CONTROL SYSTEM

Calvin J. Werner, Dayton, Ohio, assignor to General Motors Corporation, Detroit, Mich., a corporation of Delaware Application October 14, 1935, Serial No. 44,901
Renewed October 12, 1938

8 Claims. (Cl. 172—233)

This invention relates to an improved system of motor control and particularly a system for controlling the operation of a plurality of motors.

In many instances it is advisable to use several motors, particularly in refrigerating apparatus where it is preferable to drive different elements with a separate motor rather than to put the complete load upon one motor. Generally in refrigerating apparatus the motors are operated cooperatively and, therefore, it is preferable to effect their cooperative control. Although the invention as disclosed in the present instance is not limited to refrigerating apparatus the system as disclosed is particularly adapted to such use.

In refrigerating apparatus it is desirable to utilize one motor for driving the compressor and a second motor for actuating the fan used to cool the compressor and the condenser of the refrigerating apparatus. In a system of this kind it is both desirable and economical to control the compressor actuating motor and the fan driving motor by one and the same control apparatus. It is also desirable in many respects to use single phase motors that operate independently after each is started.

It is, therefore, an object of this invention to provide a system for controlling the operation of a plurality of single phase motors in which a single starting control apparatus is utilized to control the starting of the motor.

This is accomplished by providing a single switch for controlling the circuits of the auxiliary or starting windings of both of the motors. This switch normally connects the auxiliary field windings of both motors, one with the other in a series circuit across the power line. However, at a predetermined time, the switch is adapted to open this series circuit, thus to completely render said auxiliary field windings inoperative and thereby to prevent loss of power due to circulating current being affected by induced voltages in the auxiliary field windings when said field windings are included in any closed circuit during the running of the motors.

Another object of this invention is to provide a motor control system for controlling the operation of two single phase induction motors each of which is provided with main and auxiliary field windings, said system including means controlled by one of the motors for controlling the auxiliary field winding circuits of both of the motors.

This object is accomplished by utilizing a single switch for controlling the circuit including the auxiliary field windings of both of the motors, said switch being actuated in response to the operation of one of the motors and preferably the motor carrying the greater load.

A still further object of this invention is to provide a motor control system for two motors each having starting and running circuits, said system comprising a reactance element common to the starting circuits of both of the motors and means for controlling the starting and running circuits of the motor.

This last-mentioned object is accomplished by providing a common reactance element and a switch in series with the auxiliary field windings of both motors so that the auxiliary field windings, the switch and the reactance elements are in series circuit relation one with the other for starting purposes, the switch being adapted completely to open the circuit including the two auxiliary windings during the running operation of the motors and by so opening the circuit rendering said windings absolutely ineffective and inoperative during this running time.

Further objects and advantages of the present invention will be apparent from the following description, reference being had to the accompanying drawing wherein a preferred embodiment of one form of the present invention is clearly shown.

In the drawing:

The single figure of the drawing discloses a preferred form of the circuit diagram of a motor control system embodying the present invention.

In the drawing the main motor is designated by the numeral 10 and the auxiliary motor by the numeral 12. Motor 10 has a main or running winding 14 and motor 12 likewise has a main or running winding 16. These field windings are both connected across the power supply line leads 18 and 20. A main control switch 22 is provided in one of the power lines to control the power supply circuit to both of the motors.

The main motor 10 has a rotor 24 and an auxiliary winding 26 which may also be termed the "starting winding" of this motor. The other motor 12 has a rotor 28 and an auxiliary or starting winding 30. The rotors 24 and 28 are respectively magnetically associated with the main and auxiliary field windings of the respective motors. The auxiliary field or starting winding 26 has its one end connected to the movable element of the main switch 22 in the power supply line 20. Its other end is connected to one side of a reactance element 32 which is preferably a condenser. The main or running winding 14 of the motor 10 has its one end also connected with the movable element of the switch 22, while the other end is connected with the power supply line 18. The side of the condenser 32 opposite the auxiliary winding 26 is connected to a contact 48 which is one of the stationary contacts of the motor control switch 34. The other stationary contact 48 of the motor control switch is connected with one end of the auxiliary or starting winding 30 of the motor 12, the opposite end of this auxiliary winding being connected with the power supply line 18. One end of the main or running winding 16 of motor 12 is also connected to the power supply line 18 while its opposite end is connected to the movable element of the main switch 22 in the opposite power line 20.

The switch 34 is shown to be of centrifugal type automatically actuated by one of the motors; in this instance the motor designated by the numeral 10. For purposes of illustration only and for the sake of simplicity the switch has been shown diagrammatically, comprising a shaft 36 connected with the rotor 24 of the motor 10, so as to be rotated thereby. A collar 38 is secured to the shaft so as to rotate therewith and not move relatively thereto. Another collar providing the contact member 44, is carried by shaft 36 and is movable longitudinally relatively thereto. Link members 46 are pivotally secured to the collar 38 and to the collar on contact member 44, these link members supporting centrifugal weights 42. Normally, that is when the motor 10 is at rest and also when the motor is rotating below a predetermined speed, the contact 44 engages and bridges the two stationary contacts 48, thereby closing the circuit across the gap provided by the spaced contacts 48—48 between the condenser 32 and the starting winding 30. However, when the motor 10 attains a predetermined speed which is termed the "running speed" the centrifugal weights 42 will effect the movements of the links 46 to lift the contact 44 out of engagement with the stationary contacts 48 thereby breaking the bridge across these two contacts and completely opening the gap in the circuit.

This switch with its stationary contacts 48 and its bridging contact 44 is provided for the purpose of closing the series circuit including the starting windings 26 and 30 of the two motors 10 and 12 respectively and the condenser during the starting operation and until the motor 10 has attained a predetermined speed. Thereafter this switch is intended to completely open the series circuit including the starting windings 26 and 30 thereby rendering said starting windings absolutely ineffective and inoperative so that they may have no effect whatsoever upon the main windings of the motors during the running period.

The device operates in the following manner: Normally the bridging contact 44 engages its stationary contacts 48; thus when the main control switch 22 is closed to complete the circuit from the power supply line 20 to the motors, current may flow from the supply line 20 across the switch 22 through the starting winding 26 of the motor 10 across the condenser 32 to the contact 48 thence across the contact 44 to the opposite contact 48 of the switch 34, thence through the starting winding 30 of the motor 12 and back to the opposite main power lead 18. Current may also flow from the switch 22 through the main winding 14 of the motor 10 to the opposite power line 18 and current also flows from switch 22 through the main or running winding 16 of the motor 12 back to the opposite power line 18.

This completes the circuits through the two motors for starting purposes. The auxiliary or starting field winding 30 of motor 12 has preferably a lower reactance with respect to that of auxiliary field winding 26 of motor 10 and the reactance value of the condenser 32 is preferably such that the current flow through the auxiliary field windings 26 and 30 leads that through the main field windings 14 and 16. The current in the windings of both motors when so connected are dephased and consequently both motors will start to rotate. The starting circuit of the motors, that is, the series circuit including starting windings 26 and 30, condenser 32 and switch 34, is established and maintained until the motor 10 which actuates and controls the switch 34, has reached a predetermined speed at which time the centrifugal weights 42 of the switch will cause the bridging contact 44 to be disengaged from the stationary contacts 48 of the switch. When this occurs the series circuit including the windings 26 and 30 and the condenser 32 will be broken entirely, thus rendering the windings 26 and 30 absolutely inoperative and ineffective. With the series circuit, including starting windings 26 and 30, completely broken, the main windings 14 and 16 may perform their functions for the running of the motors unaffected, being entirely cut off from the starting windings 26 and 30 and thus absolutely preventing the said starting windings in any way effecting the main running windings. No bucking or circulating currents will be set up by the starting windings to effect a loss of power or increased heating of the motor in this instance as would be the case were the starting windings 26 and 30 connected in parallel and at no time completely out of circuit relation with the running windings.

Although the system as illustrated in the present drawing shows the control switch 33 as being actuated by the motor 10, it is to be understood that control could be effected in response to the operation of the motor 12. Although the switch 34 has been illustrated as one that is centrifugally actuated, it is to be understood that other types of switches might as well be used to effect the desired control.

As mentioned above the present system is particularly adaptable to be used in connection with refrigerating apparatus where one of the motors actuates a compressor the other a fan for cooling purposes. In such an application of this system the motor provided with the larger auxiliary field winding, shown in the drawing as motor 10, is preferably the one used for driving the compressor while the smaller motor having the smaller field winding, shown in the drawing as motor 12, is preferably used for driving the fan. The reason for this choice is the desirability for having greater starting torque for starting the compressor.

From the aforegoing description of the system and its operation it will be apparent that in the illustrated preferred form of invention the device comprises chiefly a power supply line 18 and 20, two single phase induction motors 10 and 12, each having a main field winding 14 and 16 respectively connected across the power supply line 18—20. These motors 10 and 12 are also provided with auxiliary or starting windings 26 and 30 respectively connected in series one with the other across the power line for starting purposes the circuit including the said auxiliary field windings also being provided with a switch 34 normally closing the circuit during said starting operation but adapted completely to open said circuit when its driving motor 10 attains a predetermined speed. The complete opening of the circuit by this switch renders the auxiliary field or starting windings 26 and 30 absolutely ineffective and inoperative thereby in every way preventing them from affecting the running windings 14 and 16 during the normal running of the motors 10 and 12.

The advantages of this system are:

(1) A single switch is adapted to control a plurality of the motors.

(2) Even though a single starting switch is utilized for controlling the starting of the motors, the auxiliary field or starting windings of said motors are rendered completely inoperative and ineffective when the switch is actuated to open the circuit.

Thus inasmuch as the auxiliary field or starting windings are rendered completely inoperative or ineffective, circulating currents found in systems where windings are not completely cut out of the working circuits are entirely eliminated and therefore consequent losses in the auxiliary field windings during running operation and heating up of the motor are prevented.

What is claimed is as follows:

1. A motor control system comprising, in combination, a power supply line, two single phase induction motors having main field windings connected across the power supply line and auxiliary field windings with different reactances and a switch controlled by one of the motors, said auxiliary field windings being connected in series with one another through said switch so that when the switch is opened both of the auxiliary field windings are effectively open circuited and the series connection between the auxiliary field windings is broken.

2. A motor control system comprising, in combination, two motors of different size each having main and auxiliary field windings, said auxiliary field windings being connected in series for starting the motors, a switch connected in series with and between the auxiliary field windings for de-energizing and breaking the series connection between the auxiliary field windings when one of the motors is running normally.

3. A motor control circuit comprising a power supply line, in combination, two single phase induction motors of different rated power having starting and running circuits and each having main field windings connected to the power supply line and auxiliary field windings, the auxiliary field windings of one of said motors having greater reactance than the auxiliary field winding of the other motor, said auxiliary field windings being connected in series across the power supply line, a condenser connected in series with the auxiliary field windings, said condenser having sufficient reactance to effect a flow of current through the auxiliary field windings that leads the current through the main field windings when the starting circuit is established, and means for controlling the starting and running circuits.

4. A motor control system comprising, in combination, a two-wire power supply line, two single phase induction motors having main and auxiliary field windings, said main field windings being connected in parallel across the power supply line, one end of one of the auxiliary field windings being connected to one of the power supply line wires and one end of the other auxiliary field winding being connected to the other power supply line wire, a condenser and a switch connected in series, the other end of one of the auxiliary field windings being connected to the condenser and the other end of the other auxiliary field winding being connected to the switch so that the two auxiliary field windings and the condenser and switch are connected in series across the power supply line when the motors are started, said switch being controlled by one of the motors to break the connection between the auxiliary field windings when the motors are running.

5. A motor control system comprising, in combination, a power supply line, two single phase induction motors having main field windings connected to the power supply line and auxiliary field windings, a switch controlled by one of the motors, each of the auxiliary field windings having one end connected directly to the power supply line and the other end connected to the power supply line through the switch and the other auxiliary field windings, said switch being closed when the motors start and open when the motors are running normally.

6. A motor control system comprising in combination, a power supply line; two single phase induction motors each having a starting and a running winding, the starting windings of both motors being connected in a series circuit with the supply line for starting purposes; and a switch also connected in series with said starting windings and adapted to open said series circuit to render the starting windings completely ineffective.

7. A motor control system comprising in combination, a power supply line; two single phase induction motors each provided with a starting and a running winding, the starting windings of both motors being connected in series with each other and with the power supply line for starting purposes; and a switch also connected in series with the starting windings and adapted to open said series circuit to render both of said starting windings completely inoperative when one of said motors is operating normally.

8. A motor control system comprising in combination, a power supply line, two single phase induction motors each provided with a starting and a running winding, said starting windings being normally connected in a series circuit with the power supply line; and a motor actuated switch in said series circuit and adapted to open said circuit to render the starting windings completely ineffective when the switch actuating motor is running normally.

CALVIN J. WERNER.